United States Patent [19]

Pacifici

[11] Patent Number: 4,667,882
[45] Date of Patent: May 26, 1987

[54] DEVICE FOR APPLYING FOAM TO TEXTILES
[75] Inventor: Joseph A. Pacifici, LaGrange, Ga.
[73] Assignee: West Point Pepperell, Inc., West Point, Ga.
[21] Appl. No.: 311,773
[22] Filed: Oct. 15, 1981
[51] Int. Cl.⁴ .............................................. B05B 1/34
[52] U.S. Cl. ................... 239/455; 239/590.5; 239/597
[58] Field of Search ............... 239/590.3, 590.5, 597, 239/553.3, 455

[56] References Cited

U.S. PATENT DOCUMENTS

| | | |
|---|---|---|
| 1,610,542 | 12/1926 | Wilson . |
| 1,987,962 | 1/1935 | Leupold ........................ 239/590.3 |
| 2,090,727 | 8/1937 | Gosmann ..................... 239/590.3 X |
| 2,775,773 | 1/1957 | Marsh . |
| 3,111,273 | 11/1963 | Mei ................................ 239/590.3 |
| 3,156,292 | 11/1964 | Ross . |
| 3,428,258 | 2/1969 | Duggan ........................ 239/590.3 |
| 3,531,053 | 9/1970 | Miller et al. . |
| 3,574,338 | 4/1971 | Shelor . |
| 3,601,320 | 8/1971 | Du Plessis . |
| 3,628,503 | 12/1971 | Neuhaus . |
| 3,697,314 | 10/1972 | Stritzko . |
| 3,865,078 | 2/1975 | De Howitt . |
| 3,880,357 | 4/1975 | Baisch ......................... 239/590.3 X |
| 3,899,135 | 8/1975 | O'Brian . |
| 3,907,210 | 9/1975 | Dow et al. . |
| 3,970,192 | 7/1976 | von Wolffradt ............... 239/597 X |
| 4,093,125 | 6/1978 | Shatila et al. . |
| 4,141,315 | 2/1979 | Nassenstein . |
| 4,201,321 | 5/1980 | Patzelt et al. ................. 239/553 X |
| 4,297,860 | 11/1981 | Pacifici et al. ................. 118/600 X |

Primary Examiner—Andres Kashnikow
Attorney, Agent, or Firm—Cushman, Darby & Cushman

[57] ABSTRACT

A device is provided for uniformly appyling foam onto textiles. The applicator includes a pair of concentric pipes dimensioned to define a space between the pipes which is filled with a porous material. The inner pipe is provided with at least one longitudinally extending slit angularly offset with respect to a longitudinally extending discharge slit in the outer pipe. Foam supplied to the inner pipe passes through its slit(s), the porous material, and the discharge slit of the outer pipe so as to be deposited on the textile material.

5 Claims, 2 Drawing Figures

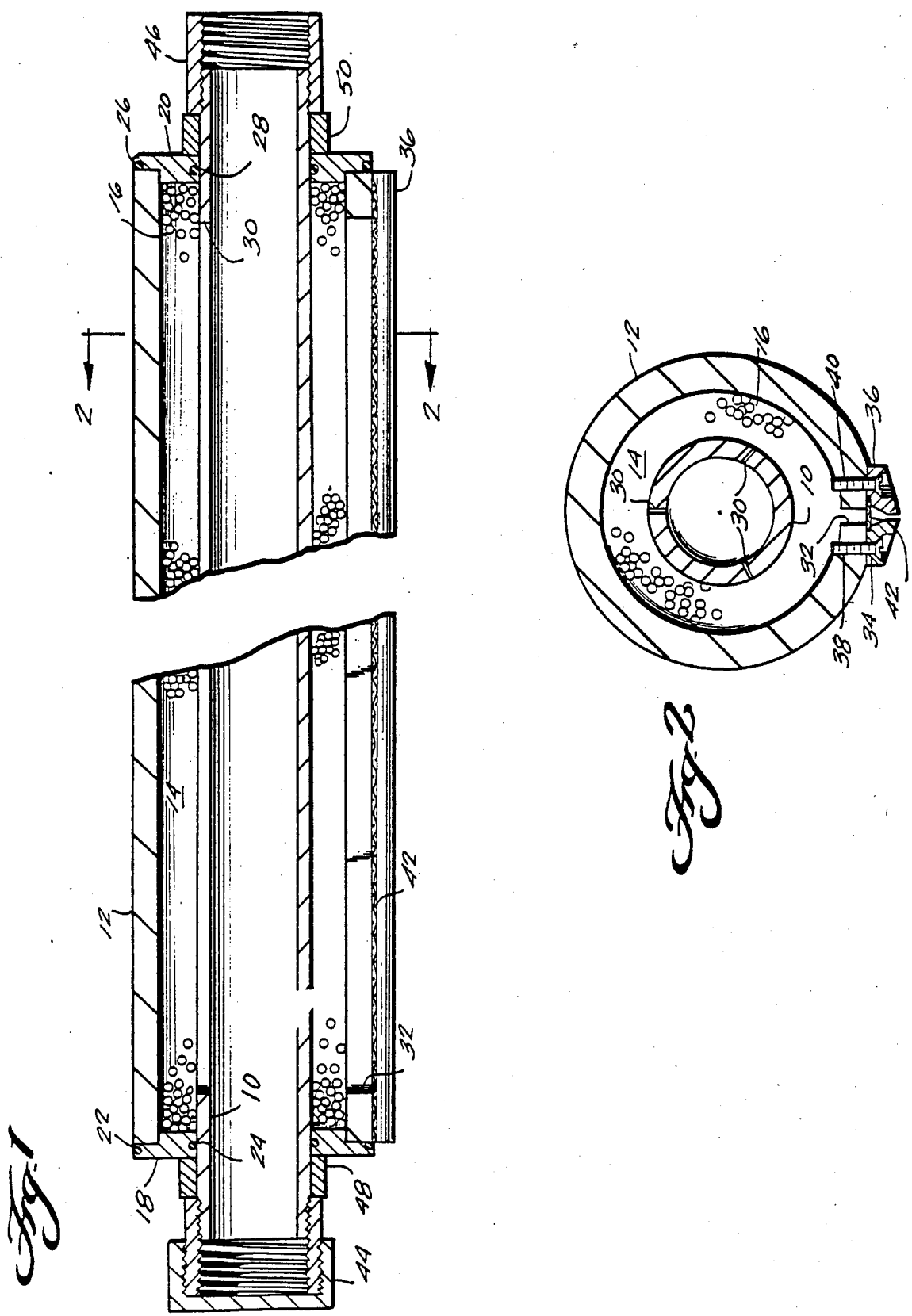

DEVICE FOR APPLYING FOAM TO TEXTILES

BACKGROUND OF THE INVENTION

It is well recognized that wet processing in the textile industry is a major source of energy consumption. With the advent of high energy costs, and concern as to the availability of oil and natural gas, considerable effort has been expended in reducing energy usage for wet processing techniques such as bleaching, dyeing, printing and finishing.

A technology which has developed as a result of energy conservation research in the textile field is the use of foams for wet processing. By foaming techniques, the amount of liquid applied to the textiles is reduced substantially thereby greatly lowering the amount of energy required to dry the product. Not only is there a saving of energy, but foaming also permits increased productivity and a variety of other advantages.

Known foaming techniques generally utilize metering rolls and/or doctor blades for applying the correct amount of foam to the textile. A more complete discussion of such arrangements is presented in U.S. Pat. No. 4,297,860, which was granted to Joseph A. Pacifici et al on Nov. 3, 1981. This patent discloses an arrangement which includes an applicator in which foam is directed to an apertured spreader plate having on its downstream side a chamber which is trapezoidal in cross-section and filled with a bed of porous material. Foam passing through the porous bed exits from the applicator through an elongated discharge nozzle at the tapered end of the chamber.

The applicator disclosed in U.S. Pat. No. 297,868 is capable of producing a uniform foam discharge, but it suffers the disadvantage of requiring a substantial amount of purge time before this is accomplished. Furthermore, the applicator is not capable of being readily altered in orientation to permit variations in the direction of foam discharge. In U.S. Pat. No. 4,201,321, which was granted to Heinrich Patzelt et al on May 6, 1980, a device comprising a pair of concentric pipes having different diameters is disclosed as being suitable for use as an applicator in a foam generating operation. A foamable reaction mass supplied to the inner pipe passes through apertures therein into a hollow space between the pipes from which it exits through a longitudinally extending discharge slot in the outer pipe onto a conveyor where a sheet of foam is formed. In order to achieve uniform discharge of the foamable reaction mass, it is necessary that the inner pipe have a varying diameter produced by wedges introduced within the inner pipe.

SUMMARY OF THE INVENTION

The present invention overcomes the deficiencies of the prior applicators by providing a device which produces uniform foam discharge and which conveniently can be oriented in any direction.

These advantages are achieved by an applicator construction which utilizes a pair of concentrically arranged pipes of different sizes so as to define a space between the pipes which is filled with a porous bed, such as glass beads. The inner pipe includes at least one slit extending longitudinally of the pipe over substantially its entire length. A similar slit is provided in the outer pipe, but the latter slit is angularly displaced with respect to the slit(s) in the inner pipe. Foam supplied to the inner pipe passes through its slit(s), through the bed of porous material, and is discharged from the slit of the outer pipe onto a textile material moved past the discharge slit. The direction of discharge can be changed merely by rotating the concentric pipe arrangement about its longitudinal axis.

DETAILED DESCRIPTION OF THE INVENTION

The invention will be described in detail with respect to the accompanying drawings, wherein:

FIG. 1 is a cross-sectional view of a preferred embodiment of the invention; and FIG. 2 is a sectional view taken along line 2—2 of FIG. 1.

Referring to the drawings, an inner pipe 10 is positioned in concentric relationship with respect to an outer pipe 12. The external diameter of pipe 10 is less than the internal diameter of pipe 12 so as to define a space 14 between the pipes which is filled with porous material 16. Suitable for this purpose are spherical beads formed from various substances, e.g. glass, and having a diameter of approximately 3 mm.

The pipes 10 and 12 are retained concentric by end caps 18 and 20 through and beyond which the inner pipe 10 projects. Suitable O-rings 22, 24, 26 and 28 seal the pipes with respect to the end caps.

The inner pipe 10 is provided with a plurality of slits 30, as can be appreciated particularly with reference to FIG. 2. These slits are disposed 120° apart and extend substantially the entire length of the portion of pipe 10 between caps 18 and 20. Typically, the slits have a width of about 0.020", which is substantially less than the diameter of the beads 16. Each slit 30 may be formed by a single elongated opening in pipe 10 or, alternatively, by a plurality of spaced apertures aligned along the length of the pipe.

The outer pipe 12 has a discharge slit 32 extending longitudinally of the pipe and having a length substantially the same as that of the slits 30. Slit 32 is angularly offset with respect to the slits 30.

The actual width of the discharge opening from the outer pipe 12 is determined by a pair of tapered elements 34 and 36 secured to the exterior of the pipe by screws 38 and 40. By conventional means, the opening established by the spacing between elements 34 and 36 can be varied as desired. A typical range of adjustment is from 0-⅛".

The slit 32 has a width which is larger than the diameter of the beads 16. Accordingly, a screen 42 is held in place over slit 32 by elements 34 and 36 to prevent the escape of the beads.

The ends of inner pipe 10 extending beyond caps 18 and 20 are threaded to permit various connections. While it is possible for foam to be supplied to the applicator from both ends of pipe 10, it is preferred that the supply of foam be from one end only. Accordingly, a cover 44 is connected at an end of the pipe and the opposite end receives the supply of foam through an adapter indicated generally as 46. Both the cover 44 and adapter 46 are separated from end caps 18 and 20 by spacers 48 and 50.

In operation, foam supplied through adapter 46 to the interior of pipe 10 passes through slits 30 into the space 14 between the pipes. The porous bed of beads 16 provides a limited amount of back pressure against the flow of foam to insure uniform distribution of the foam as it passes through slit 32 in pipe 12 and then through the screen and the discharge opening defined by elements 34 and 36. With the movement of a textile past the discharge opening, the foam is evenly applied thereto.

By merely rotating the applicator, the direction of discharge can be altered, as desired. Furthermore, the compact structure of the applicator facilitates the use of more than one applicator in close proximity to one another. This can be advantageous, for example when it is desired to apply foam to opposite sides of a textile by separate applicators.

Although the arrangement which has been described provides a uniform foam discharge very quickly after initial introduction of the foam to the applicator, it is possible to replace the cover 44 with a diverter, such as a gate valve, to permit foam properties to be checked before it is allowed to pass through the applicator's discharge opening. Of course, such a diverter also can permit the foam to be sampled any time after start-up.

A feature of the applicator which has been described is that it can be made of different lengths for use with a variety of textiles ranging from narrow knits to wide carpets.

What is claimed is:

1. A foam applicator device for uniformly applying foam to textiles, comprising:
   a pair of concentrically arranged pipes having different sizes so as to define a space therebetween;
   at least one longitudinally extending slit provided in the inner one of the concentric pipes;
   a longitudinally extending slit provided in the outer one of the concentric pipes and angularly offset with respect to the slit in said inner pipe; and
   a bed of porous material filling the space between the inner and outer pipes, the bed providing back pressure within said space against the flow of foam introduced to the space through the slit in the inner one of the pipes to insure uniform distribution of foam as it is discharged fromn the device through the slit in the outer one of said pipes.

2. A device as set forth in claim 1, wherein the porous material comprises spherical beads.

3. A device as set forth in claim 1, further comprising means positioned adjacent the slit provided in the outer pipe for providing an adjustable discharge opening from said device.

4. A device as set forth in claim 1, wherein said inner pipe is provided with a plurality of longitudinally extending slits and wherein the slit in said outer pipe is angularly offset with respect to each of the slits in the inner pipe.

5. A foam applicator device for uniformly applying foam to textiles comprising:
   a pair of concentrically arranged pipes having different sizes so as to define a space therebetween;
   a cap provided at each end of the outer one of the concentric pipes, at least one end of the inner one of said pipes projecting through and beyond one of said caps;
   plurality of angularly spaced slits provided in the inner pipe and extending longitudinally therein for substantially the entire length of the pipe between said caps;
   a longitudinally extending slit provided in the outer one of the concentric pipes, said slit being angularly offset with respect to the slits in the inner pipe and extending substantially the entire length of the outer pipe;
   a porous bed of spherical beads filling the space between the inner and outer pipes and between said caps, the bed providing back pressure within said space against the flow of foam introduced to the space through the slit in the inner one of the pipes to insure uniform distribution of foam as it is discharged from the device through the slit in the outer one of said pipes; and
   means positioned adjacent the slit provided in the outer pipe for providing an adjustable discharge opening from said device.

* * * * *